United States Patent
Gao et al.

(10) Patent No.: US 11,234,068 B2
(45) Date of Patent: Jan. 25, 2022

(54) WIRELESS HEARING DEVICE AND A CHARGING BASE

(71) Applicant: GN Audio A/S, Ballerup (DK)

(72) Inventors: Samuel Gao, Ballerup (DK); Daphi Dai, Ballerup (DK); Lillian Wu, Ballerup (DK)

(73) Assignee: GN Audio A/S, Ballerup (DK)

( * ) Notice: Subject to any disclaimer, the term of this patent is extended or adjusted under 35 U.S.C. 154(b) by 0 days.

(21) Appl. No.: 17/121,543

(22) Filed: Dec. 14, 2020

(65) Prior Publication Data

US 2021/0185425 A1 Jun. 17, 2021

(30) Foreign Application Priority Data

Dec. 16, 2019 (CN) .......................... 201911295533.6
Dec. 30, 2019 (CN) .......................... 201911392174.6

(51) Int. Cl.
*H04R 1/10* (2006.01)

(52) U.S. Cl.
CPC ......... *H04R 1/1025* (2013.01); *H04R 1/1008* (2013.01); *H04R 2420/07* (2013.01)

(58) Field of Classification Search
CPC ................ H04R 1/1025; H04R 1/1008; H04R 2420/07; H02J 7/0044
See application file for complete search history.

(56) References Cited

U.S. PATENT DOCUMENTS

| | | | | | |
|---|---|---|---|---|---|
| 4,930,148 | A | * | 5/1990 | Lee | H01Q 1/273 379/430 |
| 5,095,382 | A | * | 3/1992 | Abe | H04B 10/114 398/202 |
| 7,639,832 | B2 | * | 12/2009 | Mann | H02J 7/0044 381/370 |
| 8,593,573 | B2 | * | 11/2013 | Price | H04N 21/41 348/552 |

(Continued)

FOREIGN PATENT DOCUMENTS

EP 0389174 A1 9/1990
WO 2018146088 A1 8/2018

OTHER PUBLICATIONS

The extended European search report issued in European Application No. 202141933.3, dated Mar. 18, 2021.

*Primary Examiner* — Jason R Kurr
(74) *Attorney, Agent, or Firm* — Hamre, Schumann, Mueller & Larson, P.C.

(57) ABSTRACT

A wireless hearing device system comprising a wireless hearing device and a charging base. The wireless hearing device comprises a first earphone, a connecting band extending from the first earphone, a rechargeable battery and band contacts arranged on the connecting band. The charging base comprises a band support with support contacts, whereby the hearing device can be docked in the base, such that band contacts are in electrical contact with the support contacts, whereby the rechargeable battery can be recharged. The connecting band and the band support are adapted to be (Continued)

engageable in a contact range (X), in which the connecting band and the band support can be displaced in relation to each other in the longitudinal direction of the connecting band. The band contacts and the support contacts are embodied to be in electrical contact with each other in any position within this contact range (X).

14 Claims, 7 Drawing Sheets

(56) References Cited

U.S. PATENT DOCUMENTS

| | | | |
|---|---|---|---|
| 9,008,328 B2* | 4/2015 | Urano | H04R 3/00 |
| | | | 381/74 |
| 10,390,121 B2* | 8/2019 | Kim | H04R 1/1066 |
| 2019/0373353 A1 | 12/2019 | Yuen et al. | |
| 2020/0162807 A1* | 5/2020 | Lim | H01R 13/6205 |

* cited by examiner

WIRELESS HEARING DEVICE AND A CHARGING BASE

TECHNICAL FIELD

The invention to a wireless hearing device system comprising a wireless hearing device and a charging base, wherein the wireless hearing device comprises a first earphone, a connecting band extending from the first earphone, a rechargeable battery and band contacts arranged on the connecting band, and wherein the charging base comprises a band support with support contacts, whereby the hearing device can be docked in the base, such that the band contacts are in electrical contact with the support contacts, whereby the rechargeable battery can be recharged.

BACKGROUND ART

U.S. Pat. No. 7,639,832 B2 discloses a hearing device according to the preamble. A disadvantage with such a system is, that the user must carefully align the band contact and the support contact in order to secure correct docking for recharging. There is a need for a more convenient system, where the user in an easy, but still reliable way can dock the hearing device on the charging base.

DISCLOSURE OF INVENTION

The hearing device system according to the preliminary part is characterised in that the connecting band and the band support are adapted to be engageable in a contact range, within which the connecting band and the band support can be displaced in relation to each other in the longitudinal direction of the connecting band, and in that that the band contacts and the support contacts are embodied to be in electrical contact with each other in any position within this contact range. Thus, the user does not have to precisely align the band contacts and the support contacts when docking the hearing device. The connecting band and the band support only need to be aligned in the transversal direction, and within the contact range in the longitudinal direction. This makes it easer and faster for the user to dock the hearing device.

According to an embodiment, the connecting band is a headband comprising a bottom face facing the user's head when the hearing device is worn, an opposite top face facing away from the user's head, when the hearing device is worn, and two opposite side faces connecting the bottom face and the top face.

According to an embodiment, the band contacts are arranged on the bottom face.

According to an embodiment, the band contacts are arranged in recesses, so their surfaces are retracted from the remaining surface of the bottom face. Hereby the contacts can be made of hard metallic material without causing discomfort for the user when worn.

According to an embodiment, the band contacts are made of soft, electrical conducting material, such as electrically conductive silicon rubber. If a head band is provided with such contacts, the comfort level can be maintained compared to a traditional headband with no contacts.

According to another embodiment, the band contacts are arranged on the side faces. With such a solution, the bottom face can be made of any material in order to optimise the comfort for the user wearing the hearing device.

According to an embodiment, the band contacts are embodied as two rows of separate interconnected contacts. Such a solution can be an advantage for different reasons, f. ex. in order to make the band bendable to adapt it to different head sizes or simple design purposes.

According to an embodiment, the band contacts are embodied as longitudinal rails extending along the longitudinal direction of the connecting band. These rails can be at least 4 cm, 6 cm, 8 cm, 10 cm, 12 cm, 14 cm or 16 cm long.

According to an embodiment, the support contacts are embodied as point shaped contacts, such as pogo pins.

According to an embodiment, the support contacts are embodied as longitudinal rails. These rails can be at least 4 cm, 6 cm, 8 cm, 10 cm, 12 cm, 14 cm or 16 cm long.

According to an embodiment, the band contacts are embodied as point shaped contacts, such as pogo pins.

A wireless hearing device system according to any of the preceding claims, wherein the contact range is at least 4 cm, 6 cm, 8 cm, 10 cm, 12 cm, 14 cm or 16 cm. The longer the range is, the less accurate the user needs to be when docking the hearing device.

According to an embodiment, the band contacts comprise a first central contact with a first polarity and second contact on each side of the first contact with a second polarity.

According to an embodiment, the support contacts comprise a first central contact with a first polarity and second contact on each side of the first contact with a second polarity.

BRIEF DESCRIPTION OF THE DRAWINGS

The invention is explained in detail below with reference to the drawing illustrating a preferred embodiment of the invention and in which.

MODES FOR CARRYING OUT THE INVENTION

Figure 1:
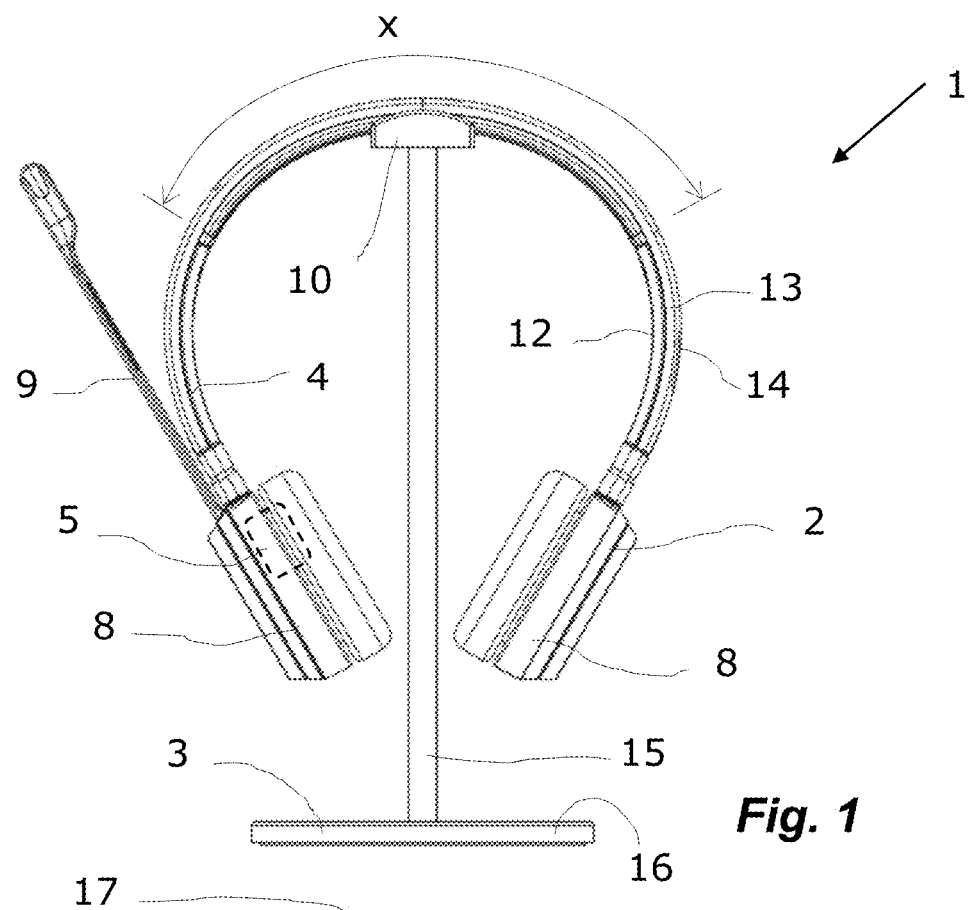
FIG. 1 is a front view of a wireless hearing device system comprising a wireless hearing device and a charging base according to a first embodiment of the invention, wherein the hearing device is arranged in a first charging position.

FIG. 1 is a front view of a wireless headset system 1 comprising a wireless hearing device 2 and a charging base 3 according to a first embodiment of the invention. The hearing device is a wireless headset 3 comprising a first earphone 8, a second earphone 18, a headband 4 connecting the first and second earphones 8, 18 and a microphone arm 9 extending from the first earphone 8. The headset 2 is wireless and is therefore provided with a rechargeable battery 5 in the first earphone 8. The battery 5 is in electrical contact with headband contacts 6 (see FIG. 4) on the headband 4. The headband 4 comprises a bottom face 12 facing the user's head when the headset 2 is worn, an opposite top face 14 facing away from the user's head, when the hearing device 2 is worn, and two side faces 13 connecting the bottom face 12 and the top face 14. Details such as speakers, microphones, sound processing electronics, radio transceiver etc. which are not relevant for the invention, will not be described here. The charging base 3 comprises a foot 16, a pole 15 extending from the foot 16 and a band support 10 at the upper end of the pole 15. In FIG. 1, the headset 2 is resting with the headband 4 on the band support 10 in a first charging position, where the headband contacts 6 are in contact with the support contacts 7 (see FIG. 4). The base 3 comprises electronics and a power supply, which is not relevant for the invention and therefore not will be described further here.

Figure 2:
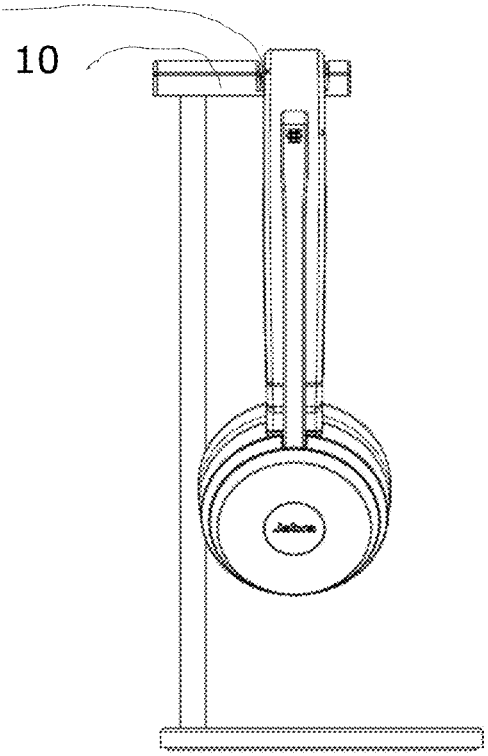
FIG. 2 is a side view of the first embodiment.

FIG. 2 is a side view of the headset system 1 with the headset 2 in the first charging position. The headband 4 is received in a recess 17 in the upper face of the band support 10.

Figure 3:
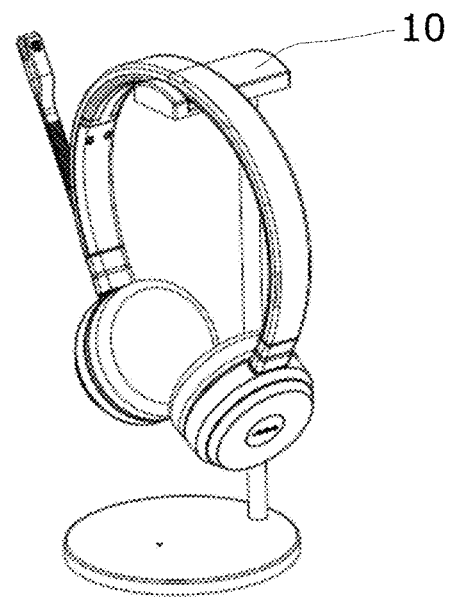
FIG. 3 is a perspective view of the first embodiment.

FIG. 3 is a perspective view of the first embodiment with the headset 1 in the first charging position.

Figure 4:
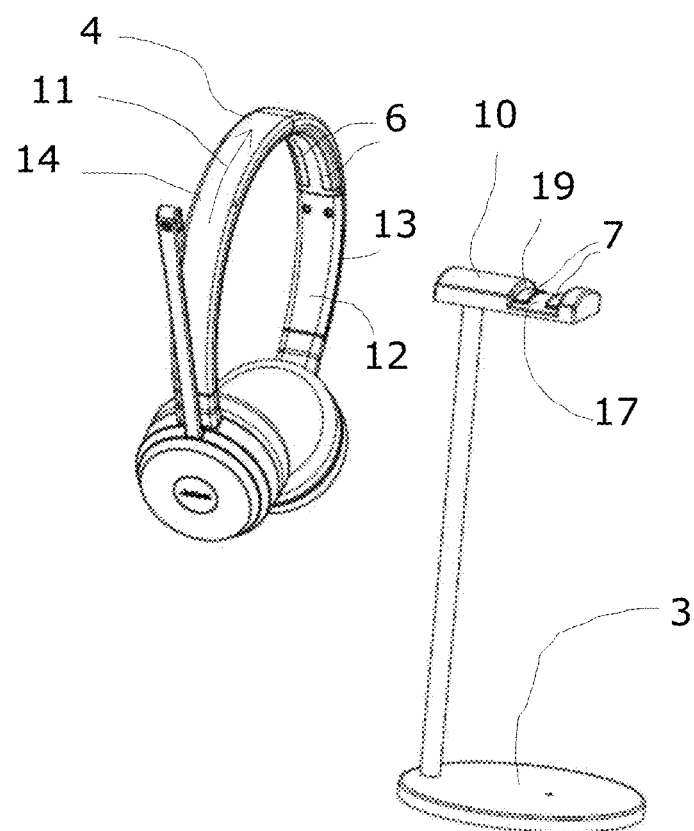
FIG. 4 is a perspective view of the first embodiment with the hearing device removed from the charging base, FIG. 5. is a front view of the first embodiment, where the hearing device is arranged in a second charging position.

FIG. 4 is a perspective view of the first embodiment with the headset 1 removed from the charging base 3. The headband contacts are embodied as two longitudinal rails 6 running on the bottom face 12 of the headband 4 in the longitudinal direction 11 of the headband 4. The support contacts are embodied as two short parallel rails 7 in the bottom of the support recess 17. When the headband 4 is received in the support recess 17, the two band contacts 6 are in contact with the two support contacts 7, whereby charging current can run to and recharge the battery 5. The headband 4 is held in place in sideways direction by recess sidewalls 19.

Figure 5:
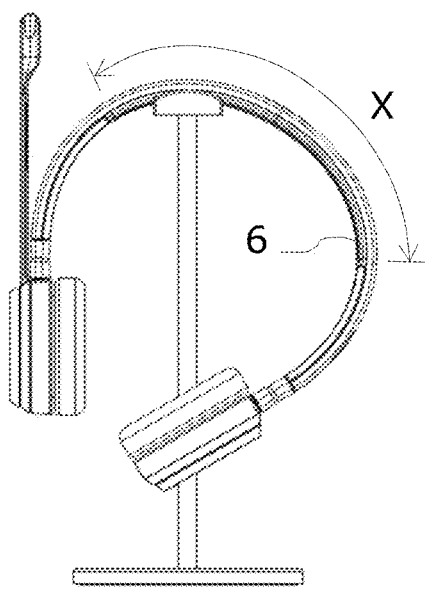
Figure 6:
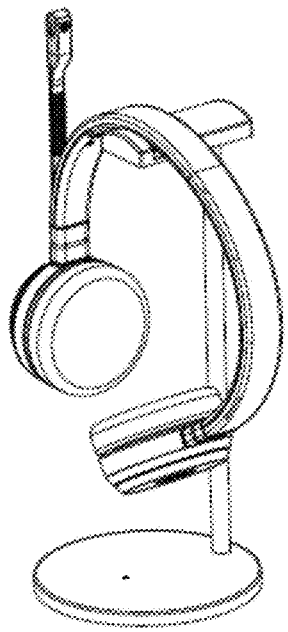
FIG. 6 is a perspective view of the first embodiment, where the hearing device is arranged in the second charging position.

FIGS. 5 and 6 are front and perspective views of the first embodiment, where the headset 2 is arranged in a second charging position. The headband contacts 6 are approximately 16 cm long and defines a "charging range" of the headband 4. Thus, the headband 4 can be arranged in the support in any position within this range X and still be charged. The user does not need to carefully align the headband contacts 6 with the support contacts 7 every time he arranges the headset 2 on the charging base 3 for charging. He just needs to be within the range X, which in this case is about approximately 16 cm. However, it could have other values, such as at least 4 cm, 6 cm, 8 cm, 10 cm, 12 cm or 14 cm.

Figure 7:
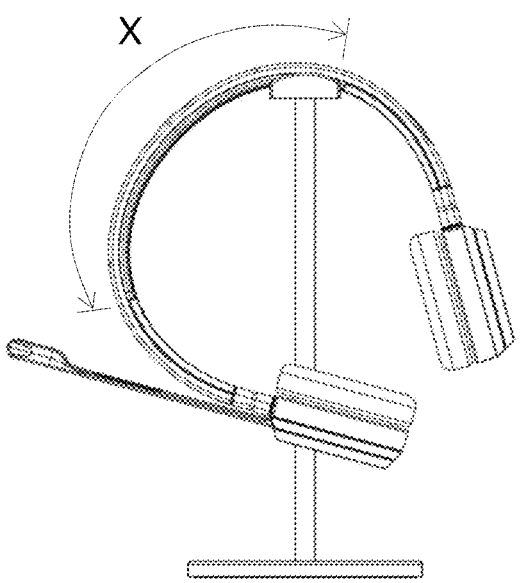
FIG. 7 is a front view of the first embodiment, where the hearing device is arranged in a third charging position, FIG. 8 a perspective view of the first embodiment, where the hearing device is arranged in the third charging position.
Figure 8:
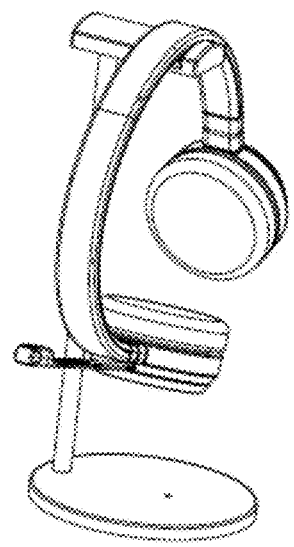

FIGS. 7 and 8 are front and perspective views of the first embodiment, where the headset 2 is arranged in a third charging position.

The longitudinal headband contacts 6 can be made of metal strips, which or more or les flexible. However, they could also be made compliant conducting material, such as electrically conductive silicone.

Figure 9:
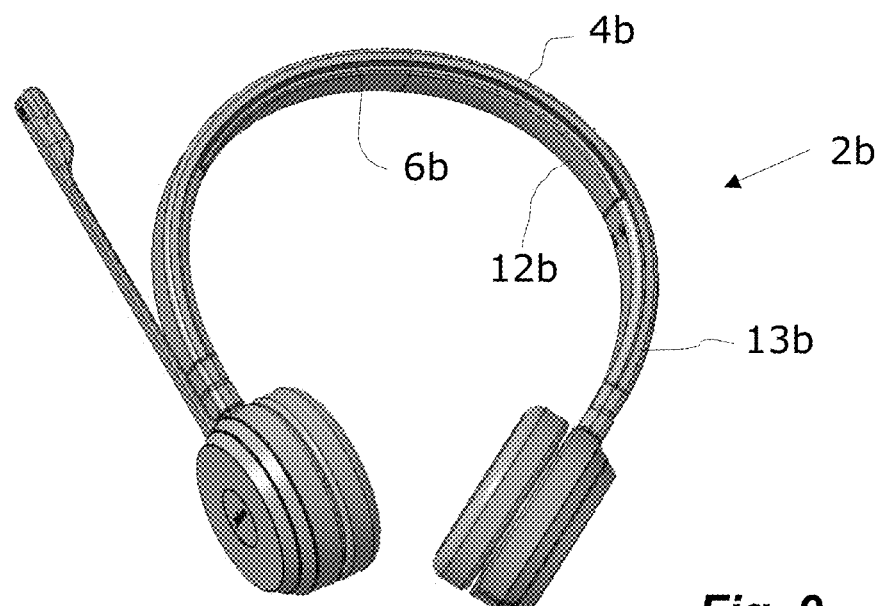
FIG. 9 is a perspective view of a hearing device of a wireless hearing device system according to a second embodiment.

FIG. 9 is a perspective view of a headset 2b of a wireless hearing device system according to a second embodiment. Here the headband contacts 6b are embodied as longitudinal rails 6b running in the longitudinal direction of the headband 4b on the side faces 13b of the headband 4b. With this embodiment, the bottom face 12b can be made of soft non-conducting material, which is comfortable for the headset user.

Figure 10:
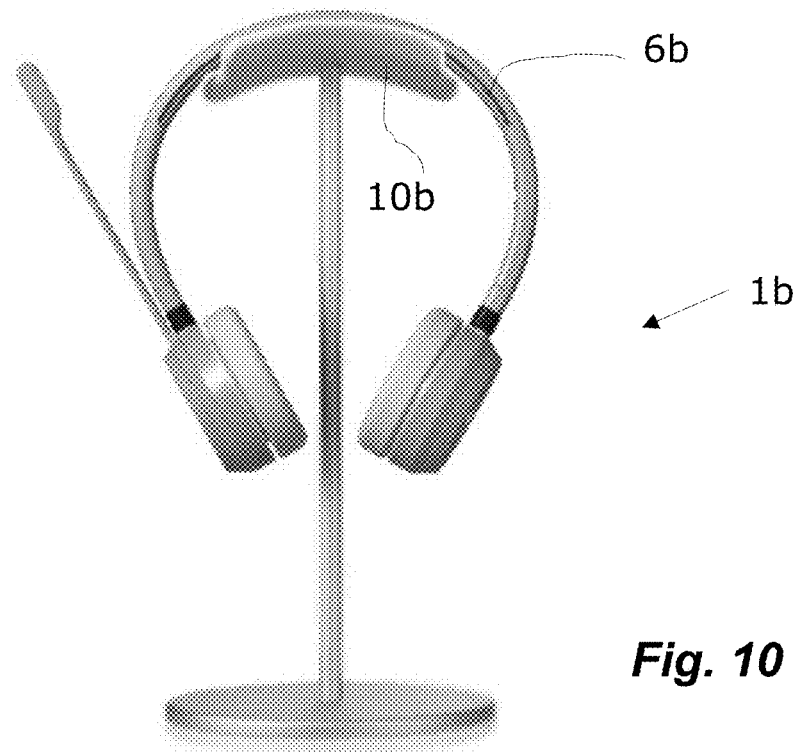
FIG. 10 is a front view of the wireless hearing device system of the second embodiment.

FIG. 10 is a front view of the wireless hearing device system of the second embodiment.

Figure 11:
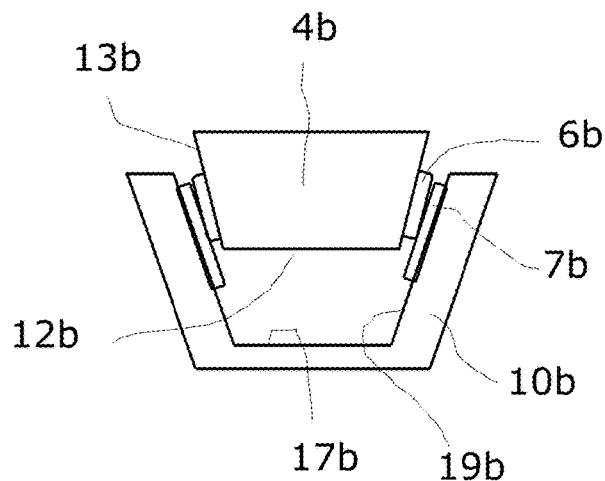
FIG. 11 is a schematic cross-sectional view through a part of the wireless hearing device system of the second embodiment.

FIG. 11 is a schematic cross-sectional view through a part of the wireless hearing device system of the second embodiment. As shown, the headband contacts 6b are arranged on the side faces 13b of the headband. The bottom face 12b of the headband is made of soft rubber material. The support contacts 7b are arranged on sloping sidewalls 19b of the support recess 17b.

Figure 12:
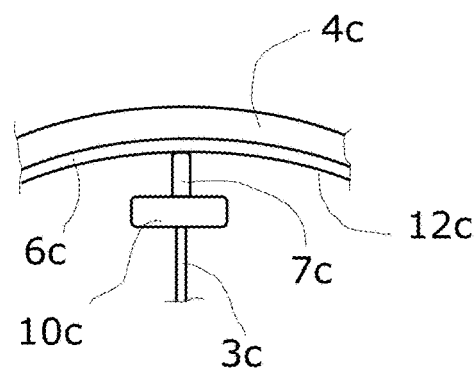
FIG. 12 is a schematic longitudinal section of a part of a wireless hearing device system according to a third embodiment.

FIG. 12 is a schematic longitudinal section of a part of a wireless hearing device system according to a third embodiment. Here the headband contacts are longitudinal rails 6c on the bottom face 12c of the headband 4c. The support contacts are a pair more or less point shaped contacts, f. ex. of pogo pins 7c.

Figure 13:
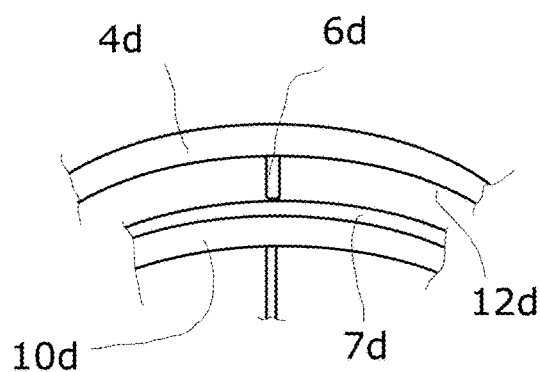
FIG. 13 is a schematic longitudinal section of a part of a wireless hearing device system according to a fourth embodiment.

FIG. 13 is a schematic longitudinal section of a part of a wireless hearing device system according to a fourth embodiment. Here the headband contacts are a pair of more or less point shaped contacts, f. ex. pogo pins 6d. The support contacts are shaped as longitudinal rails 7d on the top face of the support 10d.

Figure 14:
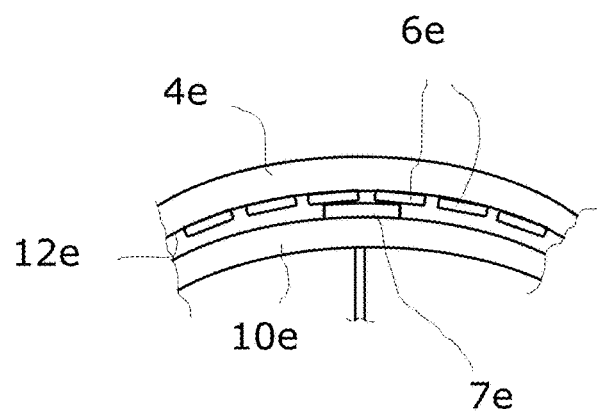
FIG. 14 is a schematic longitudinal section of a part of a wireless hearing device system according to a fifth embodiment.

FIG. 14 is a schematic longitudinal section of a part of a wireless hearing device system according to a fifth embodiment. Here the headband contacts are embodied as two rows of separate contacts 6e. The support contacts are embodied as two small plate shaped contacts 7e. The headband contacts 6e and the support contacts 7e are shaped and dimensioned, such that each support contact 7e will always touch a headband contact 6e as long as it is within the range X of headband contacts 6e.

Figure 15:
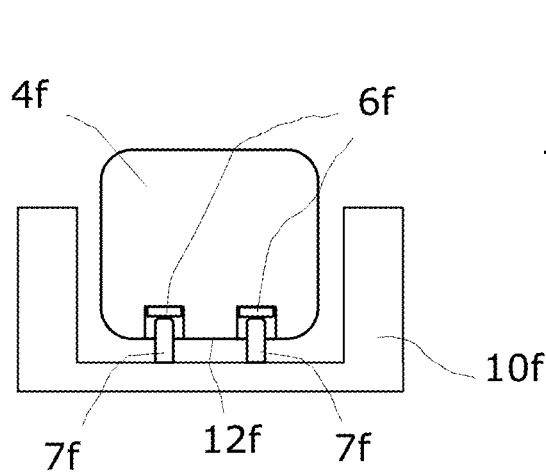
FIG. 15 is a schematic cross-sectional view of a part of a wireless hearing device system according to a sixth embodiment.

FIG. 15 is a schematic cross-sectional view of a part of a wireless hearing system according to a sixth embodiment. Here the headband contacts are embodied as longitudinal rails 6f arranged in recessions in the bottom face 12 of the headband 4f. The support contacts are pin-shaped contacts 7f with a length whereby they can reach into the headband contacts 6f, when the headset 2 is docked. The advantage of the headband contacts 6f being arranged in the bottom of recesses is, that they can be made of hard metallic material without causing discomfort for the user wearing the headset 2. The bottom face 12 can be made of pliant material.

Figure 16:
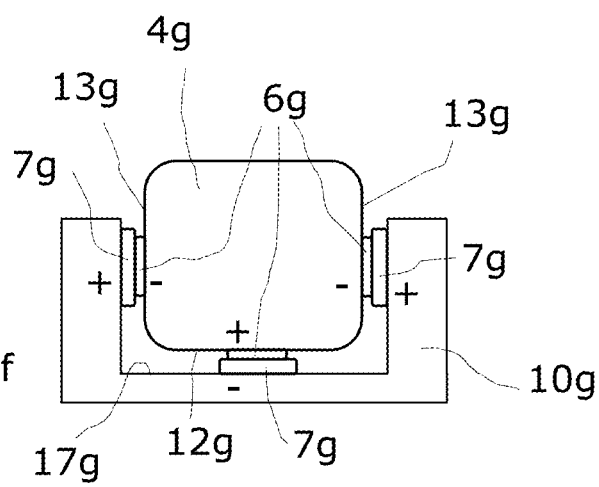
FIG. 16 is a schematic cross-sectional view of a part of a wireless hearing device system according to a seventh embodiment.

FIG. 16 is a schematic cross-sectional view of a part of a wireless hearing device system according to a seventh embodiment. Here the headband 4g has three band contacts 6g, and the support 10g has three support contacts 7. Each of the headband's 4g side faces 13 has a longitudinal band contact 6g with "−" polarity, while the headband's 4g bottom face 12 g has a longitudinal contact 6g with "+" polarity. The support recess 17 g has corresponding contacts 7g with "+" polarity on the sidewalls and a contact 7g with "−" polarity on the bottom wall. Thus, no matter in which direction the user arranges the headband 4g on the support 10g, there will be no polarity problems.

Figure 17:
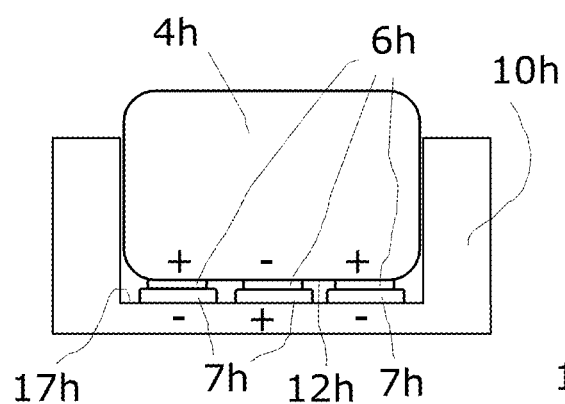
FIG. 17 is a schematic cross-sectional view of a part of a wireless hearing device system according to an eighth embodiment.

FIG. 17 is a schematic cross-sectional view of a part of a wireless hearing device system according to an eighth embodiment. This embodiment is symmetrical like the seventh embodiment with three pairs of contacts 6h, 7h. All the band contacts 6h are arranged on the bottom face 12h of the headband 4h, and all the support contacts 7h are arranged on the bottom wall of the support recess 17h.

Figure 18:
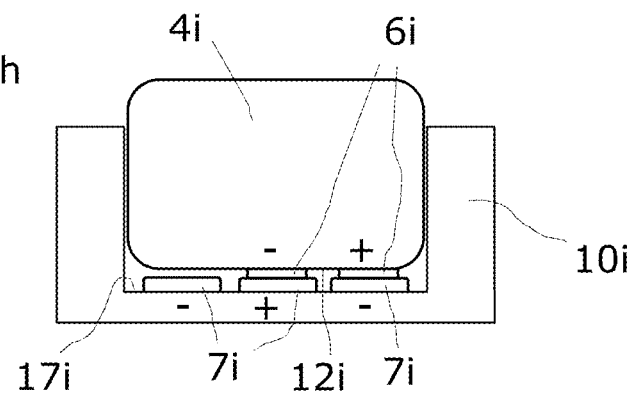
FIG. 18 is a schematic cross-sectional view of a part of a wireless hearing device system according to a ninth embodiment.

FIG. 18 is a schematic cross-sectional view of a part of a wireless hearing device system according to a ninth embodiment. This embodiment differs only from the embodiments shown in FIG. 17 by the headband only comprises two contacts 6i. No matter which direction the user arranges the headband 4i in, both poles of the band contacts 6i and the support contacts 7i will be connected.

Figure 19:
FIG. 19 is a perspective view of the first embodiment in an opposite charging position compared to the charging position shown in FIG. 3.

FIG. 19 is a perspective view of the first embodiment in an opposite charging position compared to the charging position shown in FIG. 3. Here, the headset 2 is turned 180 degrees in relation to the charging base.

Figure 20:
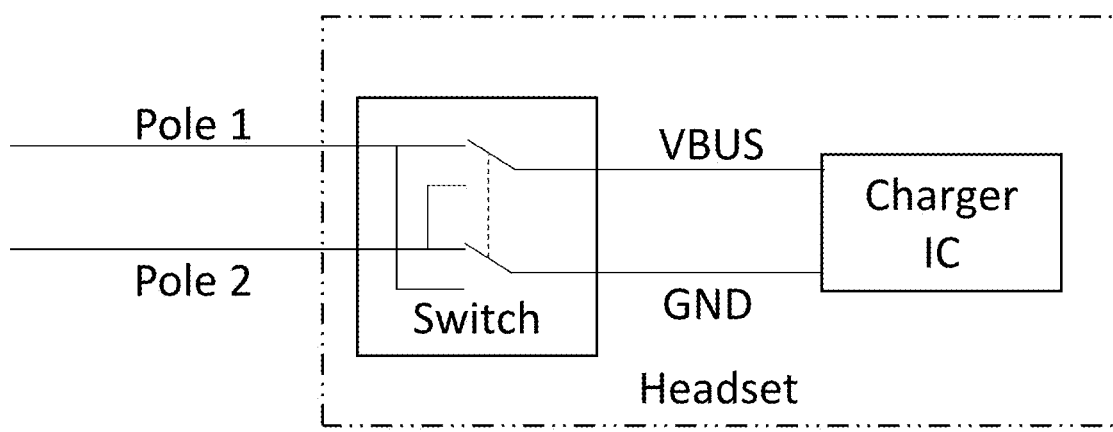
FIG. 20 is a logic switch to solve polarity issues.

FIG. 20 is a logic switch to solve polarity issues occurring when turning the headset 180 degrees in the embodiments 1-6. The switch comprises a rectifier bridge or diode bridge that provides the same polarity of output for either polarity of input.

Furthermore, safety circuitry could also ensure, that charging current will not run before proper docking is sensed, f. ex. by means if a magnet in the headband and a hall sensor in the support.

The headset 2 itself could be provided with circuitry protecting it against short circuits and electrostatic discharge (ESD).

In the shown embodiments, the headsets are duo headset comprising two earphones. However, the invention could also be exploited with mono headsets only comprising one earphone.

Instead of a headband, also a neckband could be used for docking the headset.

The term hearing device also comprises headphones, which are not capable of two-way communication.

The range X within the band and the support can be displaced in relation to each other can be f. ex. 4 cm, 6 cm, 8 cm, 10 cm, 12 cm, 14 cm or 16 cm.

REFERENCE SIGNS

1 Hearing device system
2 Wireless hearing device
3 Charging base
4 Headband/connecting band
5 Rechargeable battery
6 Band contacts
7 Support contacts
8 First earphone
9 Microphone arm
10 Band support
11 Longitudinal direction of headband
12 Bottom face of headband
13 Side faces of headband
14 Top face of headband
15 Pole
16 Foot
17 Support recess
18 Second earphone
19 Recess sidewall
X Charging range

The invention claimed is:

1. A wireless hearing device system comprising a wireless hearing device and a charging base, wherein the wireless hearing device comprises a first earphone, a connecting band extending from the first earphone, a rechargeable battery and band contacts arranged on the connecting band, and wherein the charging base comprises a band support with support contacts, whereby the hearing device can be docked in the base, such that band contacts are in electrical contact with the support contacts, whereby the rechargeable battery can be recharged, wherein the connecting band and the band support are adapted to be engageable in a contact range (X) in which the connecting band and the band support can be displaced in relation to each other in a longitudinal direction of the connecting band, and the band contacts and the support contacts are embodied to be in electrical contact with each other in any position within this contact range (X).

2. A wireless hearing system according to claim 1, wherein the connecting band is a headband comprising a bottom face facing a user's head when the hearing device is worn, an opposite top face facing away from the user's head, when the hearing device is worn, and two opposite side faces connecting the bottom face and the top face.

3. A wireless hearing system according to claim 2, wherein the band contacts are arranged on the bottom face.

4. A wireless hearing device system according to claim 3, wherein band contacts are arranged in recesses, so their surfaces are retracted from the remaining surface of the bottom face.

5. A wireless hearing system according to claim 3, wherein the band contacts are made of soft, electrical conducting material, such as electrically conductive silicone rubber.

6. A wireless hearing system according to claim 2, wherein the band contacts are arranged on the side faces.

7. A wireless hearing device system according to claim 1, wherein the band contacts are embodied as two rows of separate interconnected contacts.

8. A wireless hearing device system according to claim 1, wherein the band contacts are embodied as longitudinal rails extending along the longitudinal direction of the connecting band.

9. A wireless hearing device system according to claim 8, wherein the support contacts are embodied as point shaped contacts, such as pogo pins.

10. A wireless hearing system according claim 1, wherein the support contacts are embodied as longitudinal rails.

11. A wireless hearing system according to claim 10, wherein the band contacts are embodied as point shaped contacts, such as pogo pins.

12. A wireless hearing device system according to claim 1, wherein the contact range (X) is at least 4 cm, 6 cm, 8 cm, 10 cm, 12 cm, 14 cm or 16 cm.

13. A wireless hearing device system according to claim 1, wherein the band contacts comprise a first central contact with a first polarity and second contact on each side of the first contact with a second polarity.

14. A wireless hearing device system according to claim 1, wherein the support contacts comprise a first central contact with a first polarity and second contact on each side of the first contact with a second polarity.

* * * * *